Patented Feb. 1, 1938

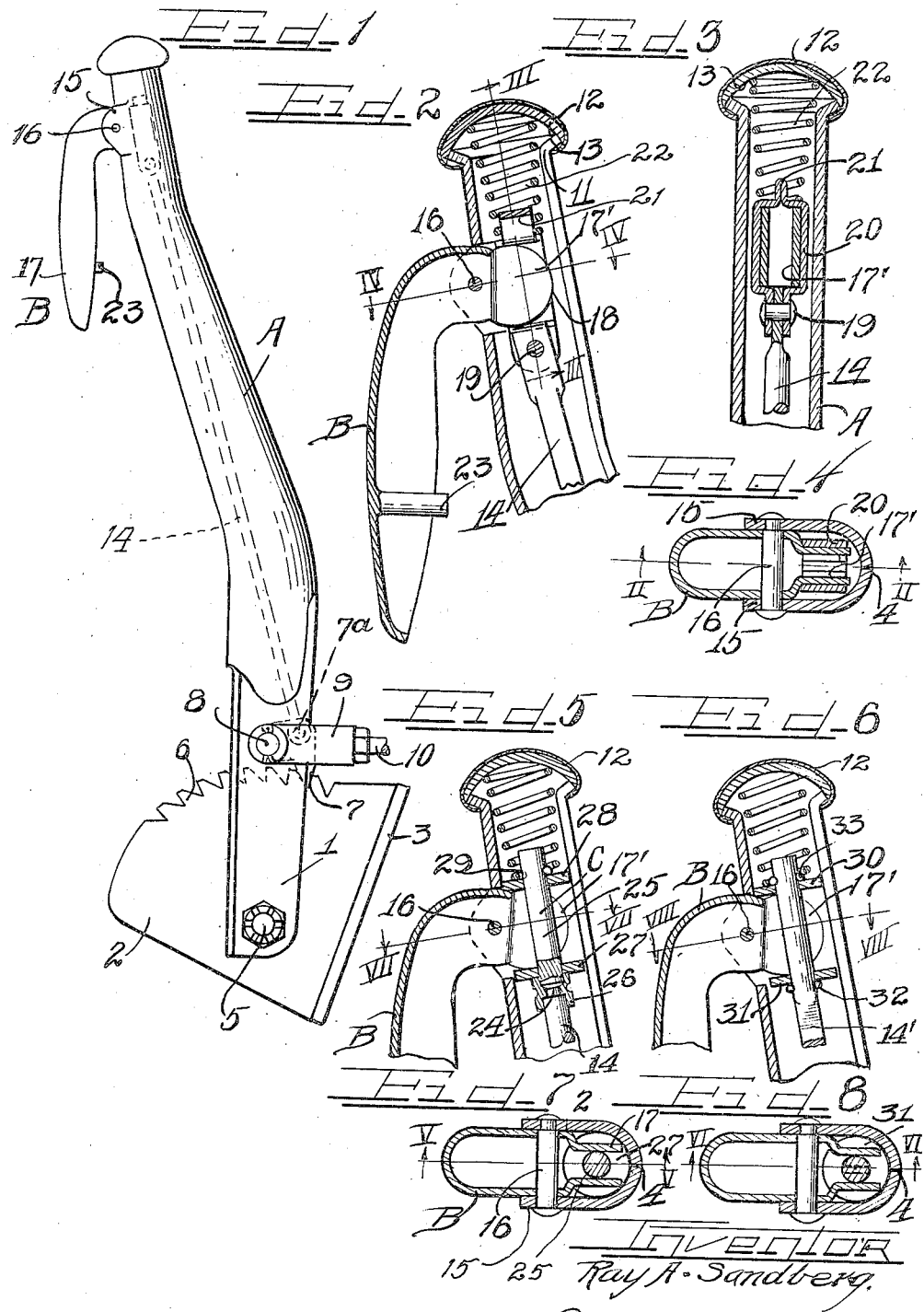

2,107,047

UNITED STATES PATENT OFFICE 2,107,047

BRAKE LEVER CONSTRUCTION

Ray A. Sandberg, Waukegan, Ill., assignor to Oakes Products Corporation, North Chicago, Ill., a corporation of Michigan Application January 15, 1936, Serial No. 59,278

16 Claims. (Cl. 74—537)

The present invention relates to brake lever construction and has to do, more particularly, with a novel arrangement of the pawl holding spring and also the manner of cooperatively connecting the pawl rod to its operating handle.

In the manufacture of brake levers for automotive vehicles, springs are utilized to maintain the pawls in one position, that is, with the pawls in engagement with selected sector or ratchet notches for holding the brake levers in desired position, with the brakes on or off as desired. Usually such springs are connected between the pawls and some parts of the levers.

The present invention contemplates and has for an object, disposition of the pawl spring within the hollow brake lever and disposed between the closed end of the lever and the adjacent end of the pawl rod.

Another object of the present invention is to provide a brake lever having a spoon type of operating handle for actuating the pawl rod and contemplates the positioning of a pawl spring within the lever between the closed or outer end of the lever and the connection of the handle to the rod.

A further object of the present invention is to simplify automotive vehicle brake lever construction whereby cam action is achieved between a pawl rod and its operating handle.

A yet further object of the present invention is to provide, in a brake lever, an angularly movable operating handle cooperating with a longitudinally movable pawl rod whereby cam action is achieved between the handle and rod.

A still further object of the present invention is to improve generally automotive hand brake lever constructions.

The above, other and further objects of the present invention will be apparent from the following description and accompanying drawing.

The accompanying drawing illustrates various embodiments of the present invention and the views thereof are as follows:

Figure 1 is a side elevational view of a brake lever constructed in accordance with the principles of the present invention, applied to a type of lever adapted for mounting on the vehicle dash.

Figure 2 is a fragmental enlarged central sectional view through the upper free end of a brake lever showing one form of effecting cooperative engagement between an angularly movable handle and a longitudinally movable pawl rod.

Figure 3 is a fragmental sectional longitudinal view taken at 90° to Fig. 2 and in the plane of line III—III of Fig. 2.

Figure 4 is a transverse sectional view taken substantially in the plane indicated by line IV—IV of Fig. 2.

Figure 5 is a fragmental sectional view similar to Figure 2 showing another form of operatively connecting the angularly movable handle and the longitudinally movable pawl rod.

Figure 6 is a view similar to Figs. 2 and 5 showing a still further modification.

Figure 7 is a transverse sectional view taken substantially in the plane indicated by line VII—VII of Fig. 5.

Figure 8 is a transverse sectional view taken substantially in the plane indicated by line VIII—VIII of Fig. 6.

The drawing will now be explained.

The brake lever illustrated herein is a hollow brake lever fashioned from flat stock and formed to provide a hollow lever A having two lower end portions 1, which are laterally spaced for straddling a ratchet or bracket plate 2. The ratchet or bracket plate 2 is shown as provided with an attaching flange 3 whereby the brake lever may be secured to a suitable part of an automotive vehicle.

In the formation of the lever, the flat stock is suitably fashioned to provide a hollow lever usually oblate in cross-sectional view with the abutting margins coming together forming a joint as indicated at 4 in Figs. 4, 7, and 8.

Preferably the brake lever, in its length, is curved to enable the attachment of the pivotal point 5 to the ratchet or plate 2 as near the dash as possible and permit the free or outer end to be spaced sufficiently to be readily grasped by an operator of the vehicle.

The ratchet or plate 2 is shown as provided with a plurality of teeth 6 formed in its upper margin for entry by a pawl 7 pivoted on a stud 8 to the legs 1 of the brake lever. The pivot 8 is of sufficient length to have attached to it a fitting 9 for connection to a pull rod or cable 10 which rod or cable, in turn, is suitably connected to the brake mechanism of the vehicle.

In the manufacture of the lever, the free end is flared as at 11 and over this flared end is spun a closure or cap 12. Underlying the cap is a reinforcement 13 which is held in position by the cap as it is spun or otherwise fixed to the free end of the lever.

Within the lever A and movable longitudinally therein is a pawl rod 14, the lower end of which is pivoted as at 7a to some portion of the pawl 7 and its other end stopping short of the end closure 12 of the lever.

At the time the lever A is fashioned two ears 15 are provided which are apertured to receive a pivot pin 16 for pivotally connecting the spoon shaped handle or actuating member B to the lever.

The handle or actuating member B is formed as a stamping of U-shape in cross section and right angular shape in elevation, with legs of unequal length, as illustrated. The longer leg 17 extends in the direction of the length of the lever away from its pivot and away from the free end of the lever. The shorter leg 17' enters the lever and has vertical portions which have curved margins as at 18.

Referring to Figs. 2 and 3, it will be observed that the rod 14 stops short of the end closure of the lever and also short of the leg 17' of the handle B.

Pivoted to the upper extremity of the rod 14 by a pivot pin 19 is a box-like or looped structure 20 fashioned from flat stock having two opposite walls which receive between them the leg 17' of the handle, as may be observed in Figs. 2 and 3. Other sides of the box-like member 20 are open for entry of the leg 17' of the handle. In the formation of the member 20, a wing 21 is formed at the upper part to serve as a center for a compression spring 22.

The spring 22 is interposed between the end closure 12 of the lever and the box 20 and is effective to maintain the pawl rod 14 and its connected pawls 7 in one position, that is, with the point of the pawl in engagement with one of the teeth 6 of the ratchet 2, as is common practice.

The spring 22 serves, when the pawl is in engagement with one of the teeth of the ratchet to maintain the other leg of the handle B away from the lever as illustrated in Figs. 1 and 2. For limiting movement of the handle B towards the lever, a stop 23 is secured to the handle as illustrated.

In the operation of the form of lever illustrated in Figs. 1, 2, and 3, the lever is pulled to brake setting position simply by grasping the free end of the lever and swinging it to the left as viewed in Fig. 1 until the brakes are applied as desired, whereupon the pawl 7 will engage one of the teeth 6 of the ratchet and hold the lever in this position. When it is desired to release the brake, the operator grasps the lever, pulls it to the left a sufficient distance to relieve pressure of the pawl against its notch, whereupon the handle B is moved towards the lever by pressure of the palm of the hand of the operator which movement raises the rod 14 against the compression spring 22 and unlatches the pawl from its notch whereupon the lever may be returned to normal or inoperative position and hand pressure on the handle B released, whereupon the spring becomes effective to cause engagement of the pawl 7 with the last notch of the ratchet which is the running position of the lever. During such movement, the handle B has arcuate movement about the pin 16 as a center while the rod 14 has longitudinal movement within the lever. The cooperative connection of the handle B with the rod 14, as described, permits such movement of the parts without imposing any undue strain on the parts. The curved faces 18 of the leg 17' of the handle B engage against the top and bottom walls of the box-like member 20 in effecting movement of the rod and so fit within the box member as to prevent rattling or lost motion.

Fig. 4, a sectional view taken in the plane of line IV—IV of Fig. 2, illustrates the cooperative relationship between the leg 17' of the handle B and the box-like member 20.

In the form of the invention illustrated in Figs. 5 and 7, the outer or free end of the rod 14 stops short of the leg 17' of the handle B. Adjacent the outer extremity of the rod 14 is formed an annular recess or groove 24. A special fitting, designated generally as C is fashioned and consists of a cylindrical part 25 and a cup 26 at its lower end. This fitting is applied over the upper or free end of the rod 14 and the cup 26 is then spun so that portions thereof enter the groove 24 in the rod, thus connecting the fitting C to the rod whereby the fitting C constitutes an extension of the rod 14. Applied over the extension 25 are two washers 27 and 28, the lower washer 27 resting against the cup 26 and the upper washer 28 being movable along the extension 25. Portions of the extension 25 are upset to provide stops 29 to limit the movement of the upper washer 28 away from the lower washer 27. The washers 27 and 28, when in operative position straddle, in the direction of the length of the rod 14, the leg 17' of the handle B and thus constitute operating surfaces for the leg 17' whenever the handle is actuated.

In the operation of this form of the invention, angular movement of the handle B about its pivot 16 will reciprocate the rod 14 by cam action between the leg 17' of the handle against the washers 27 and 28.

In the form of the invention illustrated in Figs. 6 and 8, the pawl rod 14' is shown as rectangular instead of cylindrical. In this form of the invention, the rod is extended beyond the zone of engagement between the rod and the handle B and is stopped short of the end closure of the lever. For providing surfaces to straddle, in the direction of the length of the rod 29, the leg 17' of the handle B, upper and lower washers 30 and 31 are provided which fit over the rod 29. For limiting movement of these washers along the rod, portions of the rod are struck out forming shoulders 32 and 33. In this form of the invention, the washers 30 and 31 straddle, in the direction of the length of the rod 29, the leg 17' of the handle B and thus permit cam action between the handle and the rod as the handle is rocked about its pivot 16 in use.

The washers 27 and 28, 30 and 31 are made of sufficient size to guide the pawl rod in its reciprocable movement under influence of either the handle B or the spring. In the form of the invention illustrated in Figs. 1, 2, and 3, the box-like member 20 is of such size that the corners thereof prevent disengagement between the box-like member 20 and the leg 17' of the handle B so that at all times operative engagement is assured between the handle and the cooperative connections with the pawl rod.

Because of the loose connection between the rods and the means which cooperatively connect the rod to the actuating member, relative movement between the actuating member and rod is permitted without imposing strain or distortion on either.

In all forms of the invention herein illustrated and described, it will be observed that cam action is achieved between the operating handle B and the pawl rod of the brake lever construction. Also in all forms, the spring is interposed between the end closure of the lever and the means for operatively connecting the handle to the lever, so that a neater, cleaner brake lever construction results.

The invention has been described herein more or less precisely as to details, yet it is to be understood that the invention is not to be limited thereby as changes may be made in the arrangement and proportion of parts, and equivalents may be substituted without departing from the spirit and scope of the invention.

The invention is claimed as follows:

1. A hollow brake lever fashioned from sheet metal and having a closed outer end, a pawl rod within said lever and having its outer end in closely spaced relation to the closed end of said lever, an actuating handle pivoted to said lever adjacent the outer end of said rod and having an integral part projecting into the hollow interior of said lever, means fastened to said rod for engaging portions of said projecting handle part, and a spring interposed between the closed end of the lever and said last mentioned means.

2. A hollow brake lever having a closed outer end, a pawl rod within said lever and having its outer end in spaced relation to the closed end of said lever, an actuating handle pivoted to said lever near its outer end and having a part extending into said lever, a box-like member fastened to said rod within said lever for receiving said projecting part of said handle, and a spring interposed between said box-like member and the closed end of said lever.

3. A hollow brake lever having a closed outer end, a pawl rod within said lever and having its outer end in spaced relation to the closed end of said lever, an actuating handle pivoted to said lever near its outer end and having a part extending into said lever, two discs secured to said rod adjacent its outer end and spaced from each other longitudinally of the rod for receiving between them the projecting portion of said handle, and spring means interposed between the closed end of said lever and one of said discs for maintaining said rod in one position.

4. A brake lever construction including a hollow lever having its free end closed, a pawl rod movable within said lever and having one end adjacent the closed end of the lever, and a spring between the closed end of the lever and the adjacent end of the pawl rod effective to hold said rod and its pawl in latching engagement with a ratchet quadrant.

5. A hollow brake lever formed from flat stock and having a capped outer end, a pawl rod movable within said lever, an operating handle pivoted to said lever near its free end and having a part within said lever for cooperating with said rod, means on said rod straddling said handle part, and spring means between said last mentioned means and said lever cap for urging said rod in one direction.

6. A hollow brake lever having a capped outer end, a pawl rod movable within said lever with its outer end stopped short of said lever end cap, means fastened to said rod adjacent its outer end to cooperate with an actuating handle, an actuating handle pivoted to said lever near its outer end and having a part entering said lever and associated with said last means to move the rod, and spring means within said lever and interposed between said first means and lever cap to maintain said rod in one position.

7. In a brake lever construction, a hollow brake lever having a closed outer end, a pawl rod movable within said lever and disposed with its outer end inwardly spaced from the closed end of said lever, a spring within the lever between the closed end of the lever and the outer end of said rod, and an operating handle pivoted to said lever adjacent its closed outer end and having a part projecting into the lever, and spaced bearing surfaces operatively connected to said rod receiving said projecting part between them.

8. In a brake lever, a pawl rod movable within the lever, an actuating handle pivoted to said lever for operating said rod, said handle having a part entered within said lever and laterally straddling the rod, and means on said rod providing longitudinally spaced bearing surfaces for receiving said handle part between them, said handle part working against said surfaces in the direction of the length of the rod.

9. In a brake lever, a pawl rod movable within said lever, an actuating handle pivoted to said lever for operating the rod, said handle having a part projecting into said lever and laterally straddling the rod, and collars on said rod spaced longitudinally thereof receiving therebetween said handle part for cooperatively connecting said handle and rod.

10. Brake lever construction including a lever pivoted to swing, said lever comprising a stamping forming hollow shank and handle portions, a pawl rod having a portion working within said hollow lever and having its end remote from the pawl end terminating adjacent the free end of the lever, a looped structure loosely connected to the said end of said rod for limited rocking movement with respect to the rod and extending toward the free end of the lever, an actuating member comprising a stamping forming a right angular element U-shaped in cross section and with legs of unequal length, said member being pivoted at the angle between its legs to said lever closely adjacent the free end of the lever and arranged with the longer leg extending along the lever in a direction away from the free end of the lever and with the shorter leg entered within the lever and contacting portions of the looped structure which are spaced in direction of the length of the rod, and spring means between the free end of the lever and the said looped structure effective normally to maintain said structure and its connected rod at its limit of maximum travel away from said end of said lever.

11. In a brake lever, a pawl rod movable within said lever, an actuating handle pivoted to said lever for operating the rod, said handle having a part entered within said lever, a looped structure surrounding said handle part and connected to said rod for cooperatively connecting said handle and rod, and a spring between said looped structure and the outer end of said lever, said structure being pivoted to said rod to compensate for differential movements of the handle and rod when actuated.

12. In a brake lever, a pawl rod movable within said lever, an actuating handle pivoted to said lever for operating the rod, said handle having a part projecting into said lever and laterally straddling the rod, collars on said rod spaced longitudinally thereof and receiving therebetween said handle part for cooperatively connecting said handle and rod, said collars being loosely supported on said rod to compensate for differential movements of the handle and rod when the handle is actuated.

13. A hollow brake lever fashioned from sheet metal and having a closed free end, a pawl rod within said lever and having its outer end in closely spaced relation to the closed end of said lever, means connected to said rod providing bearing surfaces which are longitudinally spaced in the direction of the length of the rod, an actuating member pivoted to said lever adjacent its outer end and having a part projecting into said lever and between said bearing surfaces, and spring means within said lever between its closed free end and the nearer of said bearing surfaces to urge said rod in one direction.

14. A hollow brake lever having a capped outer end, a pawl rod movable within said lever with its outer end stopped short of said lever end cap, means fastened to said rod adjacent its outer end to cooperate with an actuating handle, an actuating handle pivoted to said lever near its outer end and having a part entering said lever and associated with said last-mentioned means to move said rod in one direction, and spring means within said lever and interposed between said first means and said lever cap to move said rod in the opposite direction.

15. Brake lever construction including a lever pivoted to swing, said lever comprising a stamping forming hollow shank and handle portions, a pawl rod having a portion working within said hollow lever and having its end remote from the pawl end terminating adjacent the free end of the lever, a looped structure loosely connected to the said end of said rod for limited rocking movement with respect to the rod and extending toward the free end of the lever, an actuating member comprising a stamping forming a right angular element U-shaped in cross section and with legs of unequal length, said member being pivoted at the angle between its legs to said lever closely adjacent the free end of the lever and arranged with the longer leg extending along the lever in a direction away from the free end of the lever and with the shorter leg entered within the lever and contacting portions of the looped structure which are spaced in direction of the length of the rod, and spring means between the free end of the lever and the said looped structure effective normally to maintain said structure and its connected rod at its limit of maximum travel away from said end of said lever, said looped structure having means for positioning the contacting end of said spring means.

16. Brake lever construction including a lever pivoted to swing, said lever comprising a stamping forming hollow shank and handle portions, a pawl rod having a portion working within said hollow lever and having its end remote from the pawl end terminating adjacent the free end of the lever, means loosely connected to said rod affording bearing surfaces which are spaced in the direction of the length of the rod, the loose connection of said means and rod permitting limited relative movement between them, an actuating member comprising a stamping forming a right angular element U-shaped in cross section and with legs of unequal length, said member being pivoted at the angle between its legs to said lever closely adjacent the free end of the lever and arranged with the longer leg extending along the lever in a direction away from the free end of the lever and with its shorter leg entered within the lever extending between said bearing surfaces, means between the free end of the lever and the nearer of said bearing surfaces effective to normally maintain said rod at its limit of maximum travel away from said free end of said lever.

RAY A. SANDBERG.